United States Patent
Chen

(10) Patent No.: US 7,630,197 B2
(45) Date of Patent: Dec. 8, 2009

(54) SUPPORT STRUCTURE FOR ASSEMBLING DATA ACCESS DEVICE

(75) Inventor: Yung-Hao Chen, Chung-Ho (TW)

(73) Assignee: Cooler Master Co., Ltd., Taipei (TW)

( * ) Notice: Subject to any disclaimer, the term of this patent is extended or adjusted under 35 U.S.C. 154(b) by 345 days.

(21) Appl. No.: 11/768,303

(22) Filed: Jun. 26, 2007

(65) Prior Publication Data
US 2008/0043422 A1 Feb. 21, 2008

(30) Foreign Application Priority Data
Aug. 18, 2006 (TW) ............... 95214679 U

(51) Int. Cl.
*G06F 1/16* (2006.01)
(52) U.S. Cl. ............ 361/679.33; 361/679.39; 312/223.1; 312/223.2
(58) Field of Classification Search ............ 361/679.31, 361/679.33
See application file for complete search history.

(56) References Cited

U.S. PATENT DOCUMENTS

| | | | |
|---|---|---|---|
| 5,081,551 A * | 1/1992 | Aruga | 360/97.01 |
| 5,510,955 A * | 4/1996 | Taesang | 361/679.31 |
| 5,610,798 A * | 3/1997 | Lochridge | 361/679.6 |
| 5,921,644 A * | 7/1999 | Brunel et al. | 312/223.2 |
| 6,582,150 B1 * | 6/2003 | Davis et al. | 403/330 |
| 6,654,238 B2 * | 11/2003 | Chen | 361/679.58 |
| 6,657,868 B1 * | 12/2003 | Hsue | 361/728 |
| 7,394,651 B2 * | 7/2008 | Green et al. | 361/679.33 |
| 7,440,272 B2 * | 10/2008 | Chen et al. | 361/679.33 |
| 7,495,905 B2 * | 2/2009 | Peng et al. | 361/679.31 |

* cited by examiner

*Primary Examiner*—Jayprakash N Gandhi
*Assistant Examiner*—Anthony Q Edwards
(74) *Attorney, Agent, or Firm*—Chun-Ming Shih

(57) ABSTRACT

A support structure for assembling a data access structure of two size specifications of 2.5 inch and 3.5 inch includes a fixing seat and two supports. Two supports respectively have a first locking plate and a second locking plate, both of which are interconnected to each other with a common side, wherein the first locking plate is narrower than the second locking plate. The first locking plates may space a smaller room, when the second locking plates of two supports are arranged on the fixing seat. On the other hand, the second locking plates may space a larger room, when the first locking plates of two supports are arranged on the fixing plate. Thereby, a data access device with two size specifications of 3.5 inch and 2.5 inch may be assembled alternately.

16 Claims, 6 Drawing Sheets

SUPPORT STRUCTURE FOR ASSEMBLING DATA ACCESS DEVICE

BACKGROUND OF THE INVENTION

1. Field of the Invention

The present invention generally relates to a main support structure for computer, in particular, to a support structure of a data access device, for example, a hard disk, with two different size specifications, namely, 3.5 inch and 2.5 inch.

2. Description of Prior Art

Hard disks, commonly applied in a personal computer and a notebook computer, may be roughly divided into two specifications of 3.5 inch and 2.5 inch. However, in terms of the assembling structure provided for arranging a hard disk onto a computer according to the prior arts, it is impossible to use a common assembling structure because of the two different specifications, so there is a limitation imposed on hard disk purchase, renewal, and replacement, finally causing an insufficient interchangeability to the hard disks with different specifications, which is inconvenient for computer manufacturer and user.

According to this, aiming to solve aforementioned drawbacks, the inventor finally proposes the present invention that is designed reasonably to improve the shortcomings according to the prior arts significantly, after a long time of devoted study and research, in corporation with the application of relatively academic principles.

SUMMARY OF THE INVENTION

The invention is to provide a support structure, for assembling a data access device that has two size specifications of 3.5 inch and 2.5 inch, and thereby capable of enhancing the changeability of hard disk with different size specifications.

The invention is to provide a support structure, for assembling a data access device, and including a fixing seat arranged a plurality of first locking holes and a plurality of second locking holes and two supports; two supports respectively have a first locking plate and a second locking plate, both of which are interconnected to each other by a common side, and a number of holes are further arranged on the first and second locking plates in corresponding to the first and second locking holes on the fixing seat; wherein the first locking plate of two supports is narrower than the second locking plate; thereby, the first locking plates may space a smaller room, when the holes of the second locking plates of the two supports are locked to the second locking holes by a number of locking elements; on the other hand, the second locking plates may space a larger room, when the holes of the first locking plates of the two supports are locked to the first locking holes by a number of locking elements; therefore, it is possible to provide a single support structure capable of assembling a data access device with two different size specifications.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE INVENTION

In cooperation with attached drawings, the technical contents and detailed description of the present invention are described thereinafter according to a number of preferable embodiments, being not used to limit its executing scope. Any equivalent variation and modification made according to appended claims is all covered by the claims claimed by the present invention.

Figure 1:
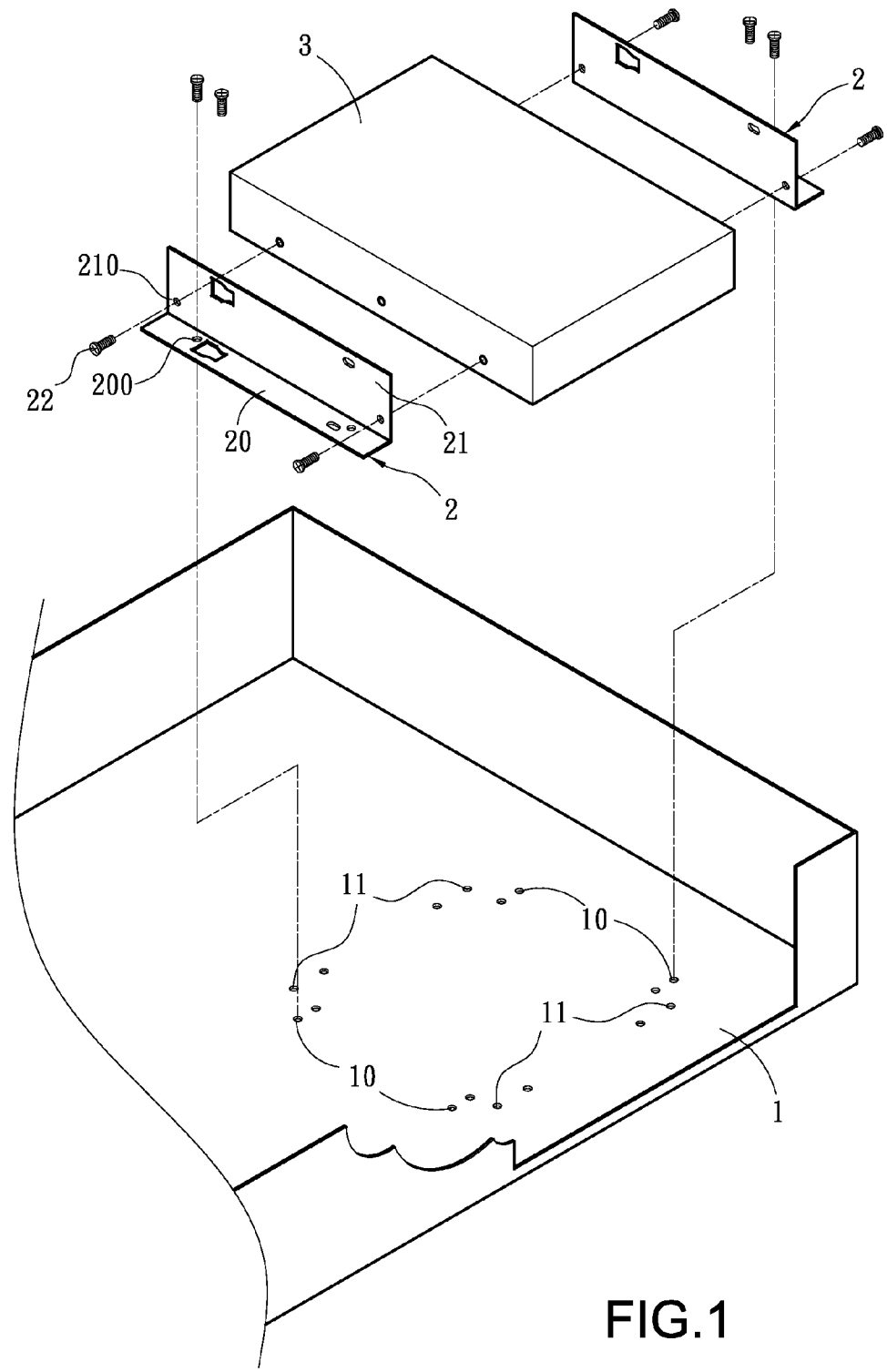
FIG. 1 is a perspective view explosively showing the present invention in cooperation with a 3.5 inch hard disk.
Figure 2:
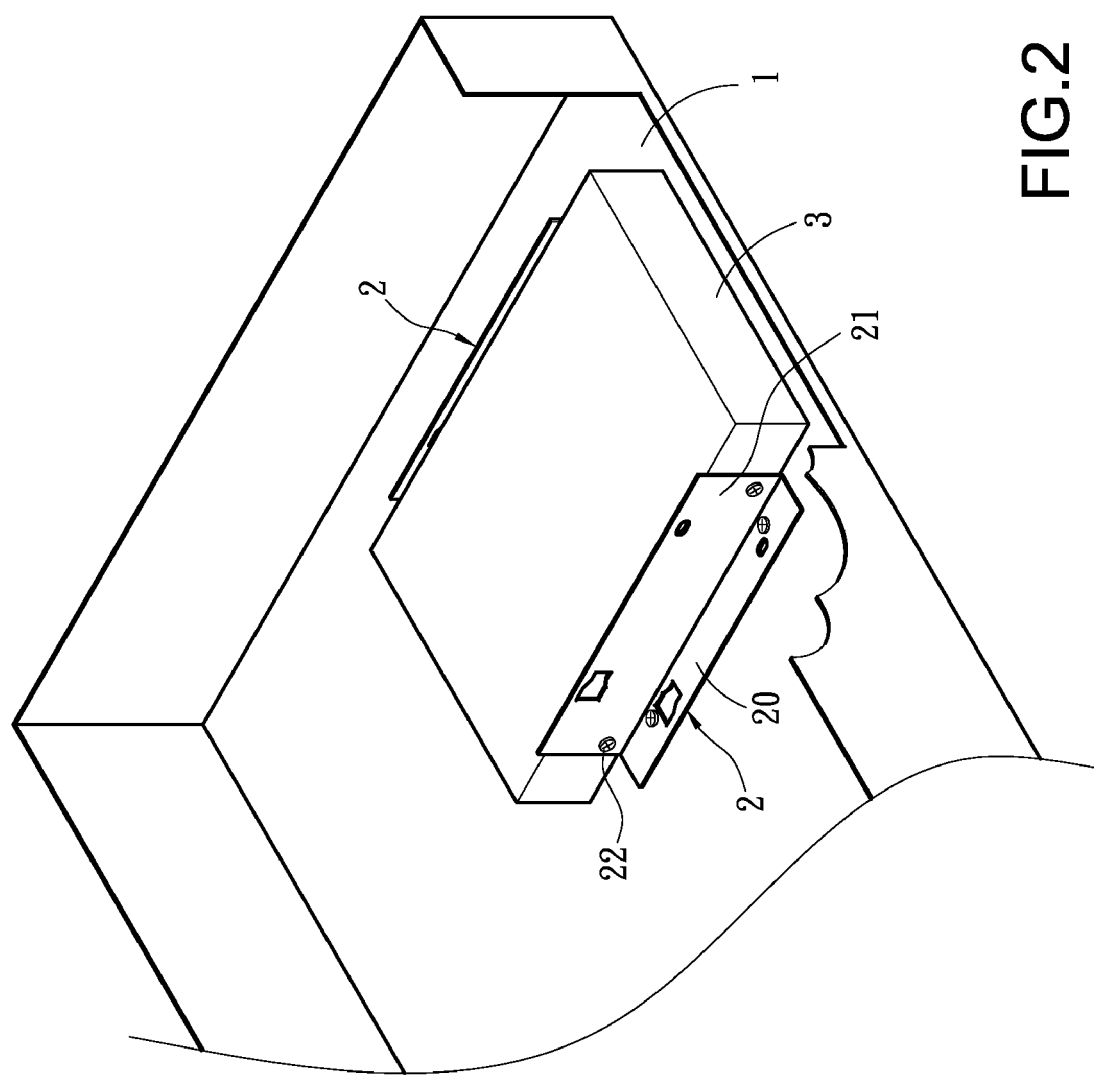
FIG. 2 is a perspective assembly view according to the present invention in cooperation with a 3.5 inch hard disk.
Figure 3:
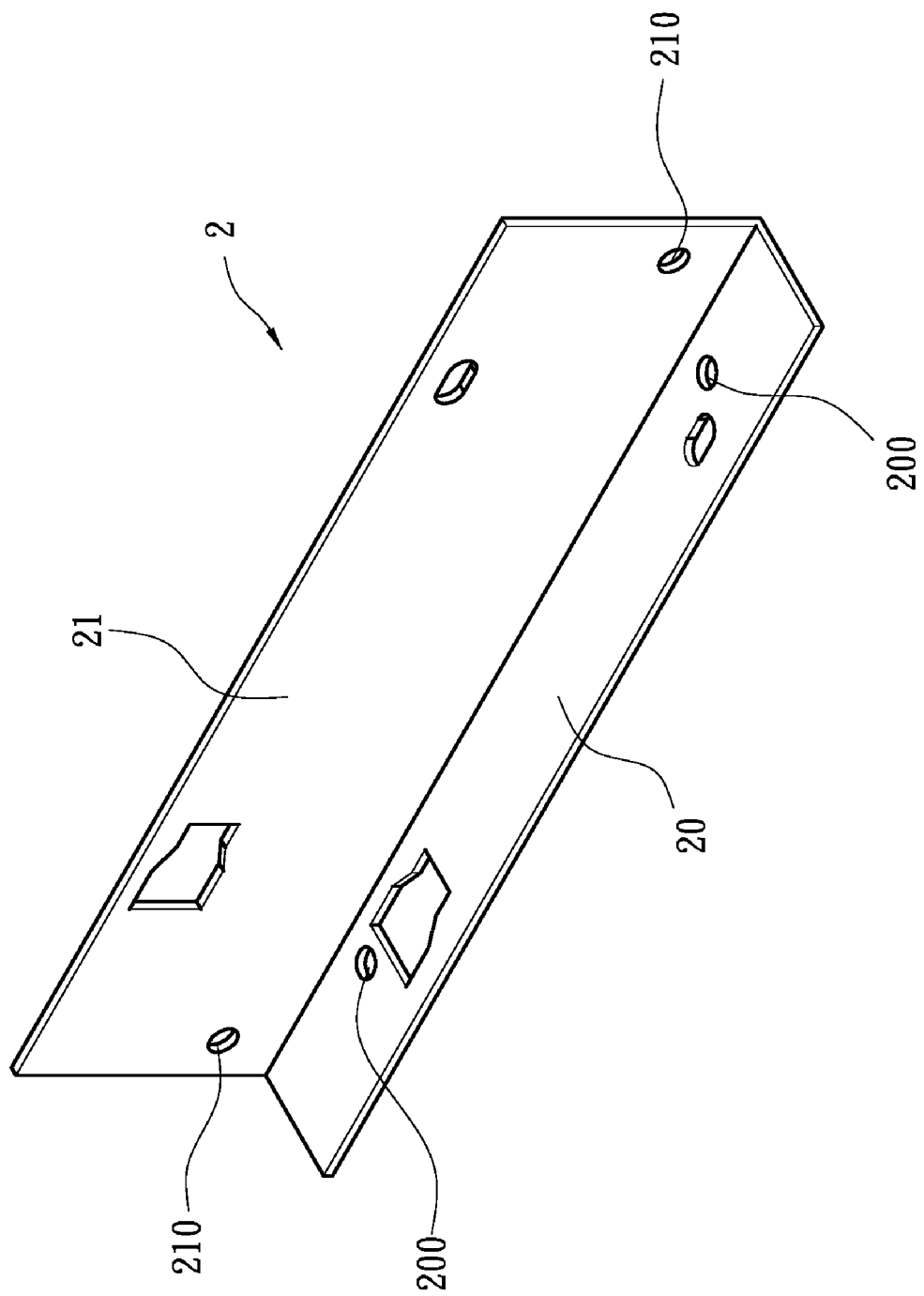
FIG. 3 is a perspective view of an outer appearance of a support according to the present invention.

Please refer to FIG. 1, FIG. 2, and FIG. 3, which separately are perspective explosive view, perspective assembly view, and perspective view of an outer appearance of a single support according to the present invention in cooperation with a 3.5 inch hard disk. The invention is to provide a support structure for assembling a data access device, which may be a hard disk, commonly used in a personal computer or a notebook computer, and respectively with two size specifications of 3.5 inch and 2.5 inch, which are designated with element numbers 3, 4. The assembly support structure mainly includes a fixing seat 1 and two supports 2.

The fixing seat 1 may be a casing frame used for a common electronic product, for example, personal computer, notebook computer, or multimedia player, mainly in terms of a portion of an electronic device for arranging a data access device thereon. A plurality of first locking holes 10 and a plurality of second locking holes 11 are arranged on the fixing seat 1 for providing two supports to be locked thereon. Two supports 2 respectively, identical to each other and shown as "L"-shaped plate body, have a first locking plate 20 and a second locking plate 21, both of which are interconnected to each other with a common side, thereby, making the support 2 configured as an "L"-shaped plate body.

There are a number of holes 200, 210 respectively arranged on the first and second locking plates 20, 21 of two supports 2. In the mean time, the holes 200 of the first locking plate 20 are in corresponding to the first locking holes 10 of the fixing seat 1, while the holes 210 of the second locking plate 21 are in corresponding to the second locking holes 11 of the fixing seat 1. The holes 200, 210 of the first and second locking plates 20, 21 may be provided for locking elements 22 (e.g. screw) to pass through, such that two supports may be locked on the fixing seat 1 or respectively locked at two sides of the hard disk 3, 4.

Figure 4:
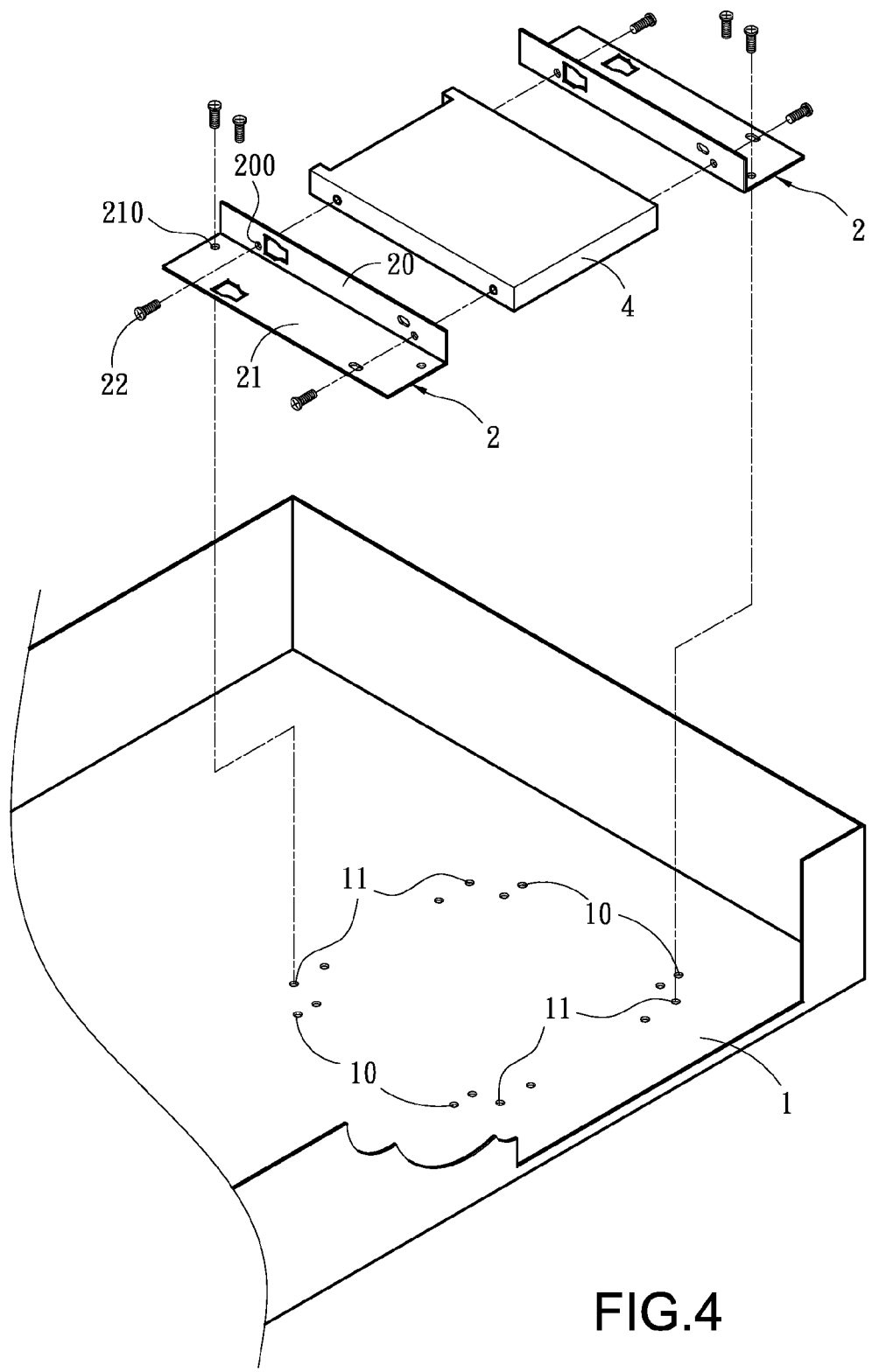
FIG. 4 is a perspective view explosively showing the present invention in cooperation with a 2.5 inch hard disk.

The invention is to provide the first and second locking plates 20, 21 of two supports 2 with two different widths. In other words, the relative distance between two supports 2 is larger, when the narrower locking plates are locked on the fixing seat 10, for providing the hard disk 3 of 3.5 inch to be able to be locked between two supports, as shown in FIG. 1. On the other hand, the relative distance between two supports are smaller, when the wider locking plates are locked on the fixing seat 10, then the hard disk 4 of 2.5 inch may be arranged between two supports 2, as shown in FIG. 4. In the embodiments according to the present invention, the first locking plate 20 of two supports 2 is narrower than the second locking plate 21. This means that the first locking plate 20 will be locked at the side of the hard disk 4 of 2.5 inch, while the second locking plate 21 will be locked at the side of the hard disk 3 of 3.5 inch. Therefore, when it is intended to arrange a hard disk of 3.5 inch on the fixing seat 10, as shown in FIG. 1, the locking elements 22 first pass through the holes 200 of the first locking plate 20 and are locked into the first locking holes 10 of the fixing seat 1, such that a room between the second locking plates 21 of two supports 2 may be spaced for accommodating the hard disk 3 of 3.5 inch, afterwards, locking elements 22 passing through the holes 210 of the second locking plates 21 and being locked into the sides of the hard disk 3 of 3.5 inch to thereby complete the procedure of assembling the hard disk 3. On the contrary, when it is intended to arrange a hard disk of 2.5 inch on the fixing seat 10, as shown in FIG. 4, the locking elements 22 first pass through the holes 210 of the second locking plate 21 and are locked into the second locking holes 11 of the fixing seat 1, such that a room between the first locking plates 20 of two supports may be spaced for accommodating the hard disk 4 of 2.5 inch, afterwards, locking elements 22 passing through the holes 200 of the first locking plates 20 and being locked into the sides of the hard disk 4 of 2.5 inch to thereby complete the procedure of assembling the hard disk 4.

Figure 5:
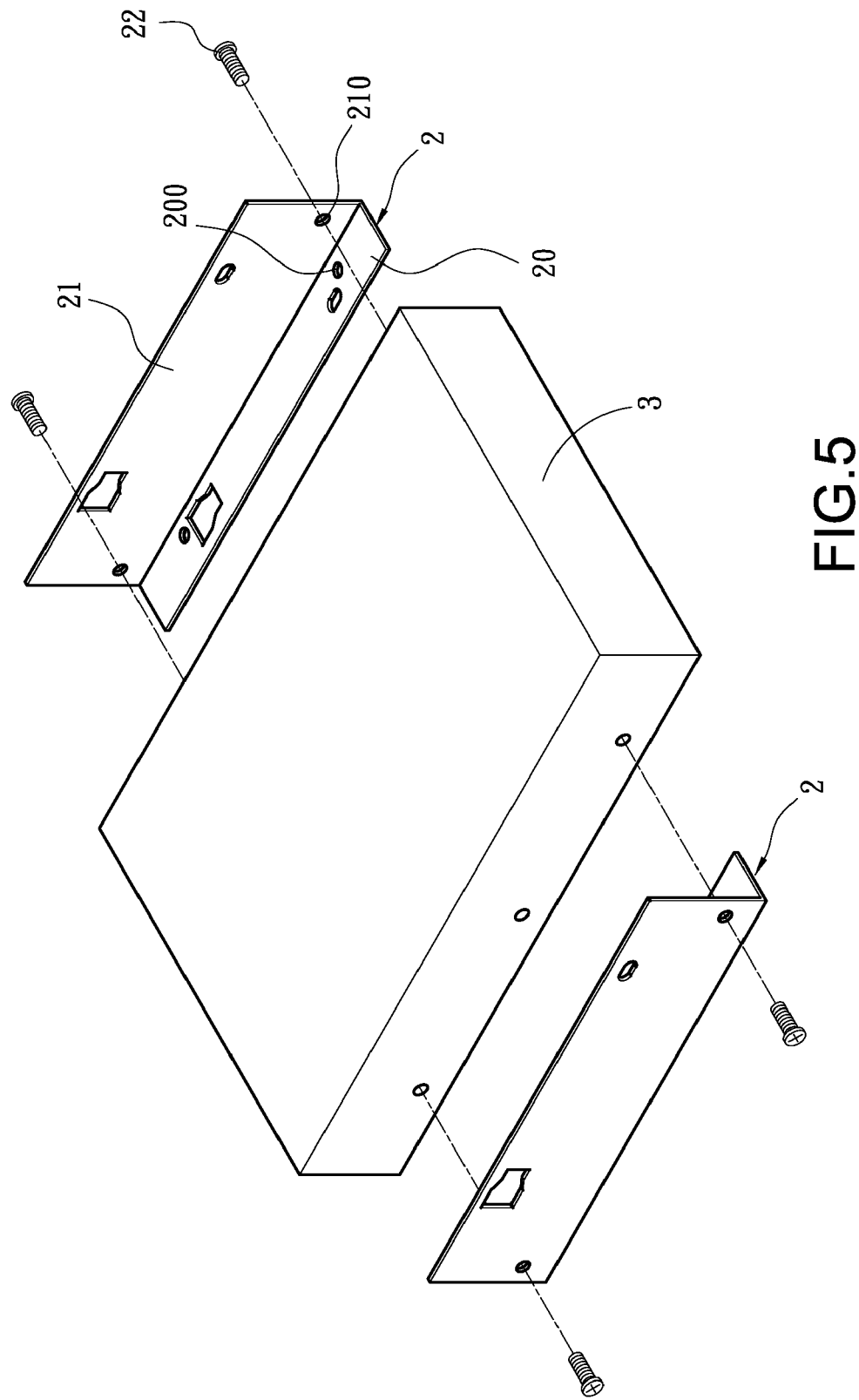
FIG. 5 is an illustration showing another embodiment according to the present invention in cooperation with a 3.5 inch hard disk.
Figure 6:
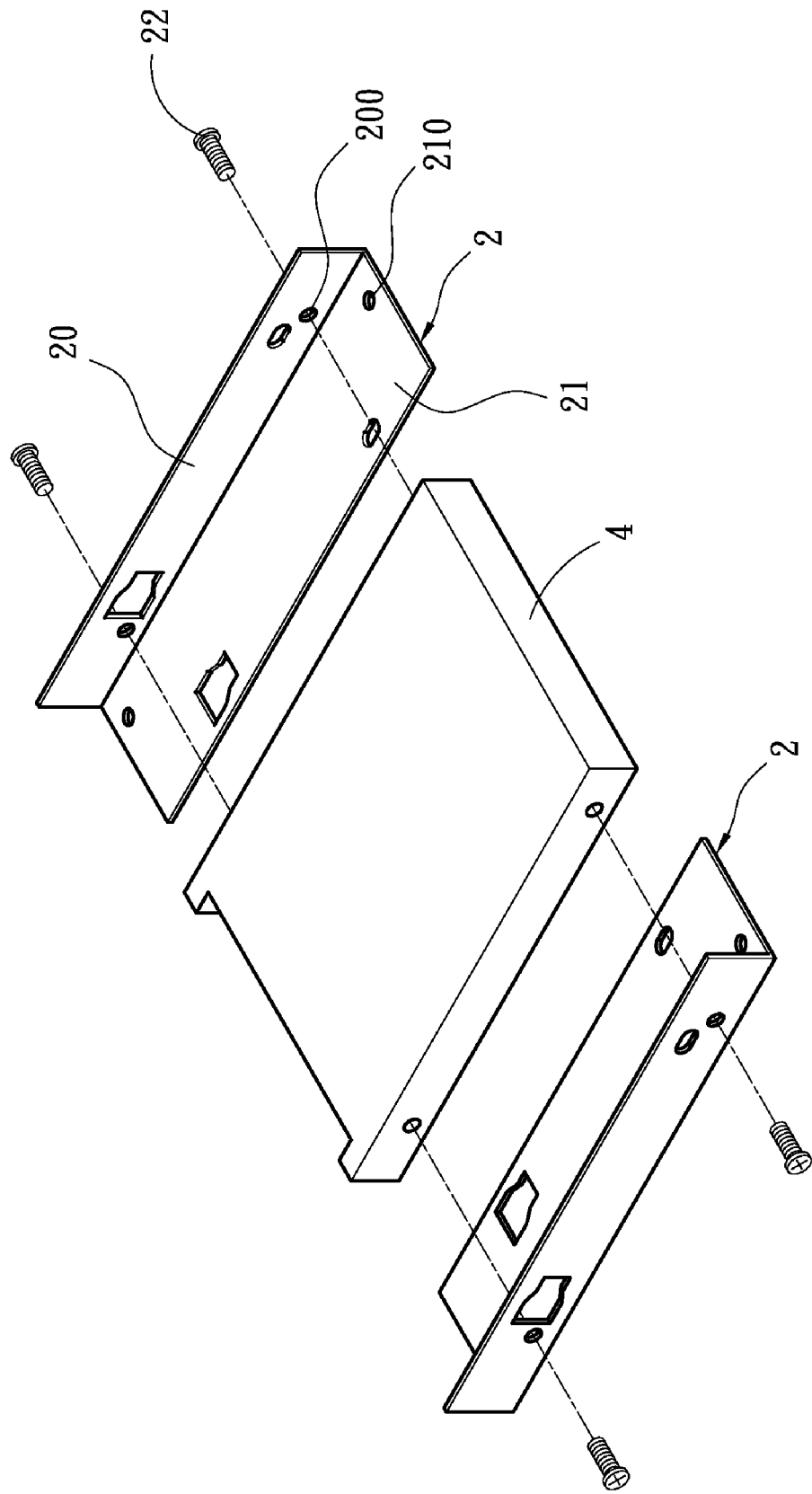
FIG. 6 is an illustration showing another embodiment according to the present invention in cooperation with a 2.5 inch hard disk.

Furthermore, as shown in FIG. 5 and FIG. 6, they respectively show another embodiment according to the present invention cooperating with the hard disks of 3.5 inch and 2.5 inch. Wherein, in terms of the assembling procedure of two supports, it is possible to process in an arranging sequence reversal to aforementioned embodiment. In other words, while two supports are arranged in a formation of back-to-back in aforementioned embodiment, two supports may also be arranged in a formation of face-to-face in the present embodiment.

Therefore, it is possible to obtain a support structure for assembling a data access device according to the present invention, by means of the structural assembly mentioned thereinbefore.

Summarizing aforementioned description, the invention is indeed an indispensable product of novelty, which may positively reach the expected usage objective for solving the drawbacks of the prior arts, and which may extremely possess the innovation and progressiveness for completely fulfilling the applying merits of a new type patent, according to which the invention is applied. Please examine the application carefully and grant it as a formal patent for protecting the rights of the inventor.

However, the aforementioned description is only preferable embodiments according to the present invention, being not used to limit the patent scope of the invention, so equivalently structural variation made to the contents of the present invention, for example, description and drawings, is all covered by the claims claimed thereinafter.

What is claimed is:

1. A support structure for assembling a data access device, comprising:
   a fixing seat, on which a plurality of first locking holes and a plurality of second locking holes are arranged; and
   two supports, which respectively have a first locking plate and a second locking plate, both of which are interconnected to each other with a common side, and a number of holes being further arranged respectively on the locking plates in corresponding to the locking holes;
   wherein a width of the first locking plate of two supports is narrower than that of the second locking plate; the first locking plates of the two supports space a smaller room, when the holes of the second locking plates are locked to the second locking holes of the fixing seat by means of locking elements; the second locking plates of the two supports space a larger room, when the holes of the first locking plates are locked to the first locking holes of the fixing seat by means of locking elements; thereby, a data access device of two size specifications may be assembled alternately.

2. The support structure for assembling a data access device according to claim 1, wherein the two supports are identical to each other.

3. The support structure for assembling a data access device according to claim 2, wherein the two supports are respectively configured as an "L"-shaped plate body.

4. The support structure for assembling a data access device according to claim 2, wherein the two supports are shown as a back-to-back arrangement.

5. The support structure for assembling a data access device according to claim 2, wherein the two supports are shown as a face-to-face arrangement.

6. The support structure for assembling a data access device according to claim 1, wherein the two supports are respectively configured as an "L"-shaped plate body.

7. The support structure for assembling a data access device according to claim 1, wherein the two supports are shown as a back-to-back arrangement.

8. The support structure for assembling a data access device according to claim 1, wherein the two supports are shown as a face-to-face arrangement.

9. A support structure for assembling a data access device of a hard disk of 2.5 inch or 3.5 inch, comprising:
   a fixing seat; and
   two supports, respectively arranged on the fixing seat and having a first locking plate and a second locking plate, both of which are interconnected by a common side, a width of the first locking plate being narrower than that of the second locking plate;
   wherein a hard disk of 2.5 inch is arranged in a room spaced by the first locking plates of the two supports, when the second locking plates are arranged on the fixing plate; a hard disk of 3.5 inch is arranged in a room spaced by the second locking plates of the two supports, when the first locking plates are arranged on the fixing seat.

10. The support structure for assembling a data access device according to claim 9, wherein the two supports are identical to each other.

11. The support structure for assembling a data access device according to claim 10, wherein the two supports are respectively configured as an "L"-shaped plate body.

12. The support structure for assembling a data access device according to claim 10, wherein the two supports are shown as a back-to-back arrangement.

13. The support structure for assembling a data access device according to claim 10, wherein two supports are shown as a face-to-face arrangement.

14. The support structure for assembling a data access device according to claim 9, wherein the two supports are respectively configured as an "L"-shaped plate body.

15. The support structure for assembling a data access device according to claim 9, wherein the two supports are shown as a back-to-back arrangement.

16. The support structure for assembling a data access device according to claim 9, wherein the two supports are shown as a face-to-face arrangement.

* * * * *